May 11, 1965     O. L. MORPHIS     3,182,881
LIQUID CONTAINERS
Filed May 15, 1963
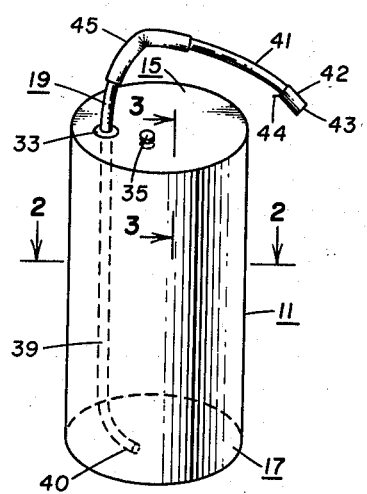
FIG. 1
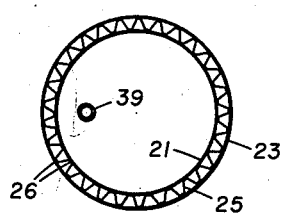
FIG. 2
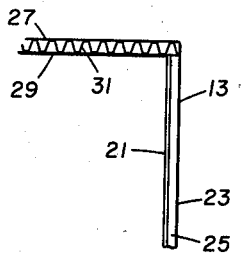
FIG. 3
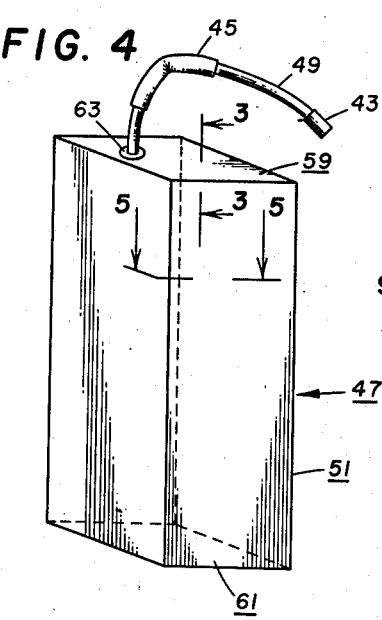
FIG. 4
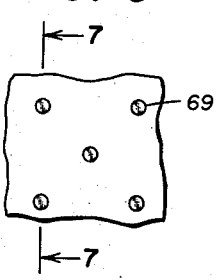
FIG. 6
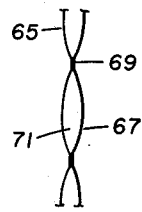
FIG. 7
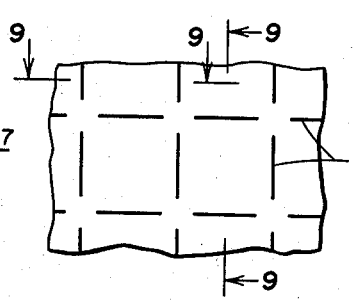
FIG. 8
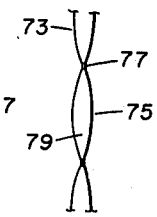
FIG. 9
FIG. 5
FIG. 10
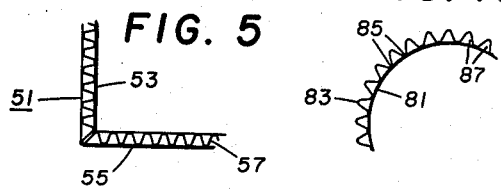
INVENTOR.
OSCAR L. MORPHIS
BY Wm T Wofford
ATTORNEY United States Patent Office 3,182,881
Patented May 11, 1965

3,182,881
LIQUID CONTAINERS
Oscar L. Morphis, 4101 Hildring Drive E.,
Fort Worth, Tex.
Filed May 15, 1963, Ser. No. 280,566
8 Claims. (Cl. 229—3.1)

My invention relates to liquid containers and more particularly to pliable thermally insulated liquid containers.

Patrons who attend public sporting events and other like activities at which refreshment beverages are sold usually purchase such beverages either at a refreshment stand located away from their seats or from a vendor who carries and sells the beverages to the patrons in their respective locations.

The beverages, whether hot or cold, are dispensed generally into open-top types of containers. But, as is well known, a hot beverage tends to quickly cool and a cold beverage tends to quickly warm; the beverage, in either case, becomes less palatable and less savorous unless it is drunk before it cools or warms. Then, too, beverages which are dispensed into open-top types of containers are apt to, and frequently do, spill therefrom with attendant inconvenience to the person and including frequent damaging of clothing and other things.

To obviate this situation, it is desirable to dispense both hot and cold beverages in a closed container wherein the beverage will be maintained at a savorous palatable thermal state for an extended period of time, and from which the liquid is not apt to spill. Such a container would be useful not only at public sporting events, as mentioned previously, but also in numerous sundry other applications such as in schools, camps, hospitals, homes, or generally wherever liquid refreshments are sold or dispensed. However, there has not been available heretofore a convenient and satisfactory closed-top type of thermally insulated beverage container which is entirely effective and satisfactory.

Accordingly, it is the general object of the present invention to provide an improved beverage or liquid container.

Another object of the invention is to provide improved types of wall and ends structure for a beverage or liquid container that is pliable, resilient and thermally insulated.

Another object of the invention is to provide an inexpensive disposable closed-top beverage or liquid container that has an effective thermally insulated, pliable type of wall and ends structure.

These and other objects are effected by my invention as will be apparent from the following description taken in accordance with the accompanying drawing in which:

FIG. 1 is a schematic perspective view of one embodiment of the liquid container of my invention;

FIG. 2 is a sectional view taken along line 2—2 of FIG. 1, showing the wall structure in accordance with a preferred embodiment of my invention;

FIG. 3 is a sectional view taken along line 3—3 of FIG. 1, and also along line 3—3 of FIG. 4;

FIG. 4 is a schematic perspective view of another embodiment of the liquid container of my invention;

FIG. 5 is a sectional view taken along line 5—5 of FIG. 4;

FIG. 6 is an elevational view of a fragment of the wall and ends structure of a liquid container in accordance with a modification of my invention;

FIG. 7 is a sectional view taken along line 7—7 of FIG. 6;

FIG. 8 is an elevational view of a fragment of the wall and ends structure of a liquid container in accordance with another modification of my invention;

FIG. 9 is a sectional view taken along lines 9—9 of FIG. 8; and

FIG. 10 is a partial cross sectional view of the wall structure of a liquid container made in accordance with another modification of my invention.

Referring now to the drawing, FIG. 1 illustrates a schematic perspective view of a liquid container 11 embodying one form of the wall and ends structure of my invention. The container 11 includes a cylindrical wall structure 13, a top end portion 15, a bottom end portion 17, and a sipping device 19.

The wall structure 13 is best described in conjunction with FIG. 2 and, as shown, it comprises an inner wall member 21, an outer wall member 23, and an intermediary corrugated wall-separating member 25. The corrugated wall-separating member 25 is interposed between and secured alternately, in any suitable manner, to the inner and outer wall portions 21, 25 respectively, along vertical lines of contact existing where the intermediary corrugated wall-separating member 25 adjoins both the inner wall member 21 and the outer wall member 23. The material of the several members of the wall structure 13, and the bottom and top end portions 15, 17 respectively, is preferably a thermoplastic type of polyvinyl resin, such as polyethylene, or the like substances. The thickness of a satisfactory type of plastics material may be, in a typical case, about eight thousandths of an inch (8 mils). The distance between the inner and outer wall members 21, 23 respectively, may be typically about one-eighth of an inch; however, this distance may be varied to suit a particular application or applications.

The structure of the top end portion 15 comprises a pair of spaced parallel sheets or membranes 27, 29 of polyvinyl resin, or other suitable plastics material, and an intermediary corrugated portion 31 interposed between the sheets or membranes 27, 29. The corrugated intermediary member 31 is secured alternately to the inner and outer sheets or membranes 27, 29 in the same manner as described hereinbefore. The peripheral edge of the top portion 15 may be sealed, in any suitable manner, to the top peripheral edge of the wall structure 13. The top end portion 15 is pierced both by the sipping device 19 which is sealed to the top end portion 15, as at 33, in any appropriate manner, and a conventional type of one-way valve 35, which is provided for a purpose to be explained hereinafter.

In general the structure of the bottom end portion 17 is substantially the same as that of the top end portion 15, and so a detailed description of the bottom end structure will not be necessary; however, it should be noticed that no one-way-flow valve, tube or other perforation are provided in the bottom end portion 17. The peripheral edge of the bottom end portion is sealed to the bottom peripheral edge of the wall structure 13 in the same manner as previously described.

The sipping device 19 is a convenient length of pliable plastics tubing which is arranged so that one portion 39 is disposed inside the container 11 and the other portion 41 is outside of the container; the device 19 being sealed to the top end portion 15 at 33, as mentioned before. The end 40 of the inside portion rests on the bottom end portion 17, as shown in FIG. 1, while the end 42 of the outside portion 41 is covered with a removable thin film, or tip 43. The thin film, or tip, 43 may be applied in any suitable manner, for example, by dipipng the end 42 into a liquid plastics material and removing same. When the liquid plastics material dries, it forms the thin film or tip 43. If desired, a thread or filament 44 may be installed between the thin film, or tip, 43 and the tube 42. When the thread or filament 44 is pulled it cuts the thin film, or tip, 43 so that it may be more easily removed. The purpose of the thin film, or tip, 43 is not only to prevent spilling liquid from the container, but also to maintain the end 42 in a sanitary condition up to the time of use. The end 42 may, of course, be sealed and sanitarily protected in any other appropriate manner. On the outer portion 41 of the sipping device 19, there is a conventional type of flow-regulating sleeve-valve 45 which comprises a loose fitting plastics sleeve surrounding the tube 41 and incorporating a thin piece of metal (not shown) which may be bent angularly so as to crimp and close the tube 41. Of course, other appropriate types of stop-flow valves may be used if desired.

FIG. 4 illustrates another embodiment of the liquid container of my invention comprising a rectangular shaped container 47 and a liquid dispensing tube 49.

The wall structure 51 of the embodiment of FIG. 4 is substantially the same as that of FIG. 1 and so a detailed description of it will not be necessary. It suffices that the wall structure of FIG. 4 includes an inner wall member 53, an outer wall member 55 and an intermediary corrugated wall-separating member 57. A top end portion 59 and a bottom end portion 61 are fixed and sealingly secured to the respective top and bottom peripheral edges of the wall structure 51 in the manner previously described. The structures of the top end portion 59 and the bottom end portion 61 are substantially the same as the respective structures of the top and bottom end portions 15, 17 described hereinbefore, except there is no one-way-flow valve 35 in the top end portion 59. And so, because the structures are substantially alike, a detailed description of the structure of the top and bottom end portions 59, 61 is not considered necessary.

The liquid dispensing tube 49 pierces the top end portion 59 and is sealed thereto, as at 63, in any suitable manner; the dispensing tube 49, however, does not extend to the bottom of the container as does the inside portion 39 of the sipping device 19. The dispensing tube 49 also has a thin film, or tip, 43 on its outer end as well as a sleeve-type valve 45 located along its length.

In the embodiments delineated ni FIG. 1 and FIG. 4, the interstices in the wall and ends structure, which are formed by the corrugated wall-separating member 25, are filled with a fluid or inert gas such as air, argon, nitrogen, carbon dioxide, and the like. The gaseous fluid is, preferably, at a slight pressure above atmospheric pressure and is injected into the interstices in any suitable manner known to those skilled in the art. The gaseous fluid, being slightly pressurized, presses against the inner and outer wall members of the wall and ends structures respectively and maintains the normal shape of the container. The gaseous fluid, moreover, contributes thermal insulating qualities to the container structure. In some applications, it may be desirable to install other types of thermal insulating materials in the interstices of the wall and ends structure.

In FIGS. 6 and 7 there is delineated a modified form of wall and ends structure which is adaptable to either or both of the types of containers of FIGS. 1 and 4. This wall and ends structure includes overlying sheets 65, 67 of a thermoplastic type of polyvinyl resin which may be of similar material and the same thickness as the material of the wall and ends structure previously described. In the modified form shown in FIGS. 6 and 7, there is no intermediary corrugated member; the overlying sheets 65, 67 being thermally or adhesively bonded together in a plurality of spot-like regions 69. The spot-like regions, of course, may be of any size and form; moreover, they may be arranged in any desirable pattern, design or manner. It will be noticed, from FIGS. 6 and 7, that interstices 71 are formed between the adjacent groups of spot-like regions, and that the interstices are fluidly interconnected. So, a gaseous fluid such as air, argon, nitrogen, carbon dioxide, and like substances may be injected into and trapped in these interstices, in a similar manner and for a similar purpose, as described previously.

In FIGS. 8 and 9 there is illustrated another modification of a wall and ends structure which is adaptable to either or both of the containers of FIGS. 1 and 4. The wall and ends structure of FIGS. 8 and 9 comprises two over-lapping sheets 73, 75 of a thermoplastic type of polyvinyl resin, which may be of similar thickness and material as the material used for the wall and ends structure previously described. But, in this modification the overlying sheets 73, 75 are bonded together, preferably along a plurality of broken (that is, non-continuous) lines of contact 77 which may be arranged in any desirable pattern, design or manner. The lines of contact 77, preferably, do not cross and do not meet at any point. This is for the reason that the gaseous fluid or other insulating material which is in like manner confined in the interstices 79 between the sheets 73, 75, may flow freely therebetween via the regions of non-linear contact. However, it is recognized that in some applications, it may be desirable to arrange the lines of contact 77 in such a manner that they do intersect or meet at some common points.

In FIG. 10 there is illustrated another modified form of wall and ends structure which is adaptable to either or both of the type of containers of FIGS. 1 and 4. The wall and ends structure here shown includes two over-lapping sheets 81, 83, one of which, sheet 83, is corrugated. The sheets 81, 83 may be of similar material and thickness as that used in the wall and ends structures described previously. The outer corrugated sheet 83 is bonded along spaced parallel lines of contact 85 occurring where the corrugations of the sheet 83 contact the inner sheet 81. As described hereinbefore, the interstices 87 formed by the corrugations may be filled with a gaseous fluid or other insulating material in the manner and for the purpose previously described. It is preferred that the corrugated sheet 83 be the outer sheet in most applications because the thermal liquid in the container will then be maintained further from a person's hand or from a table surface, or the like, which could be harmed by the heat or cold of the liquid. However, in some applications it may be desirable to place the corrugated sheet 83 inside the container.

To understand the manner of using the containers 11 and 47, reference may be made at first to FIG. 1. The container 11 may be filled, with either a hot or a cold liquid, through the sipping device 19 or in any other convenient manner; whereupon the liquid may be sealed in the container by installing the thin film, or tip, 43 in the manner suggested previously and, at the same time, by crimping the sleeve-type valve 45. The container 47 of FIG. 4 may be filled and sealed in the same manner. Now, to extract the liquid from the container 11, it is only necessary: to pull on the filament 44; to cut and then to remove the thin film, or tip, 43; to open the sleeve-type valve 45; and to suck on the end 42 of the sipping device 19. Of course, air will be admitted into the container 11 to replace the extracted liquid by means of the one-way-flow valve 35. From time to time, or as often as desired, the sleeve-type valve 45 may be crimped again to seal the tube 41. In this simple manner, the container 11 may be used and resealed; the beverage remaining therein being effectively maintained, by the thermally insulated wall and ends structure, at its initial savorous, palatable thermal state for an extended period of time.

To extract liquid from the container 47, it is only necessary: to release the sleeve-type valve 45; to strip off the thin film, or tip, 43; and to grasp and squeeze the wall structure 13 with one's hand. The pressure of squeezing deforms the wall structure 51 and forces the liquid in the container to flow therefrom, via the tube 49. It will be appreciated that repetitive or continuous squeezing of the container 47, in due time, will force practically all of the liquid from the container.

It is of course recognized that in some applications it may be desirable to omit the thermally insulated structure from a portion of the container, for example, an end.

Those skilled in the art should recognize from the foregoing description that I have provided: an improved thermally insulated, pliant liquid beverage container; a pliant, resilient double-wall type of wall and end structure which thermally insulates a liquid in the container; and an effective, inexpensive, pliant, resilient liquid container which may be discarded after a single use.

While I have shown my invention in several forms, it will be obvious to those skilled in the art that it is not so limited, but is susceptible of various changes and modifications without departing from the spirit thereof.

I claim:

1. In a fluid container, wall and end structure comprising: first and second superposed sheets of thin pliable plastics material; a corrugated sheet of thin pliable plastics material disposed between said first and second sheets and bonded to each said sheet at spaced apart areas of contact, forming interstices between said first and second sheets; and a gaseous fluid under pressure in said interstices.

2. In a fluid container, wall and end structure comprising: first and second superposed sheets of thin pliable plastics material mutually bonded together at spaced apart areas of contact; and a gaseous fluid under pressure between said first and second sheets.

3. In a fluid container, wall and end structure comprising: first and second superposed sheets of thin pliable plastics material mutually bonded together at spaced apart linear areas of contact; and a gaseous fluid under pressure between aid first and second sheets.

4. The invention as set forth in claim 2 wherein said spaced apart areas of contact are grouped and arranged in polygonal patterns.

5. The invention as set forth in claim 3 wherein said spaced apart linear areas of contact are grouped and arranged in polygonal patterns.

6. In a fluid container, wall and end structure comprising: first and second superposed sheets of thin pliant plastics material, said second sheet being corrugated and bonded to said first sheet at spaced apart areas of contact forming interstices between said superposed sheets; and a gaseous fluid under pressure in said interstices.

7. A fluid container comprising: side and end walls defining a fluid cavity within said container, said side wall comprising first and second superposed sheets of thin pliable plastics material with a corrugated sheet of said plastics material interposed between and secured alternately to said superposed sheets of material along spaced linear areas of contact and forming interstices between said superposed sheets of material, the peripheral edges of said side wall being sealingly joined to the peripheral edges of said end walls; and a pressurized gaseous thermal-insulating material in said interstices.

8. A fluid container comprising: walls defining a fluid cavity, one or more of said walls comprising first and second superposed sheets of thin pliable, resilient plastics material one said sheet being corrugated and bonded to said other sheet at spaced apart areas of contact forming interstices between said superposed sheets; and a pressurized gaseous thermal insulating material in said interstices.

References Cited by the Examiner
UNITED STATES PATENTS

| Re. 25,448 | 9/63 | Cohen et al. | |
| 1,158,581 | 11/15 | Swift | 229—90 |
| 1,592,824 | 7/26 | Fairchild. | |
| 2,591,578 | 4/52 | McNealy et al. | |
| 2,757,790 | 8/56 | Gattuso. | |
| 3,072,312 | 1/63 | Stump | 229—3.1 |

FRANKLIN T. GARRETT, *Primary Examiner.*